(12) United States Patent
Kao et al.

(10) Patent No.: US 7,187,451 B2
(45) Date of Patent: Mar. 6, 2007

(54) APPARATUS FOR MEASURING TWO-DIMENSIONAL DISPLACEMENT

(75) Inventors: Ching-Fen Kao, Hsinchu (TW); Chung-Chu Chang, Hsinchu (TW); Ching-Fang Lin, Changhua (TW)

(73) Assignee: Industrial Technology Reserach Institute, Hsinchu (TW)

( * ) Notice: Subject to any disclaimer, the term of this patent is extended or adjusted under 35 U.S.C. 154(b) by 401 days.

(21) Appl. No.: 10/935,172

(22) Filed: Sep. 8, 2004

(65) Prior Publication Data
US 2005/0062981 A1    Mar. 24, 2005

(30) Foreign Application Priority Data
Sep. 18, 2003    (TW) .............................. 92125819 A

(51) Int. Cl.
*G01B 11/02*    (2006.01)
(52) U.S. Cl. ...................................... 356/499; 356/521
(58) Field of Classification Search ................ 356/487, 356/496, 499, 521; 250/231.13, 231.14, 250/231.16, 237 G
See application file for complete search history.

(56) References Cited
U.S. PATENT DOCUMENTS

| | | | |
|---|---|---|---|
| 5,104,225 A | * | 4/1992 | Masreliez .................. 356/494 |
| 5,204,524 A | | 4/1993 | Ichikawa et al. |
| 5,424,833 A | | 6/1995 | Huber et al. |
| 5,530,543 A | | 6/1996 | Hercher |
| 6,744,520 B2 | | 6/2004 | Chang et al. |
| 6,771,377 B2 | * | 8/2004 | Jones et al. .................. 356/616 |

* cited by examiner

*Primary Examiner*—Gregory J. Toatley, Jr.
*Assistant Examiner*—Marissa J. Detschel
(74) *Attorney, Agent, or Firm*—Bacon & Thomas, PLLC

(57) ABSTRACT

An apparatus for measuring a two-dimensional displacement is disclosed and includes a laser light source, a collimator lens, a beam splitter, a plurality of staggered conjugate optic lens and a plurality of interference optical dephasing modules. The laser light source provides a laser light incident on the collimator lens to generate collimated laser beams. Each of the collimated laser beams are incident on the beam splitter to be separated into two incident beams and incident on a two-dimensional diffraction unit to generate a plurality of first diffracted beams and a plurality of second-order diffracted beams. The staggered conjugate optic lens are used to reflect the first diffracted beams so that the first diffracted beams return to the two-dimensional diffraction unit to generate a plurality of second diffracted beams where the second diffracted beams and the second-order diffracted beams generated as a result of the first diffraction of the beams stagger.

11 Claims, 3 Drawing Sheets

APPARATUS FOR MEASURING TWO-DIMENSIONAL DISPLACEMENT

BACKGROUND OF THE INVENTION

1. Field of the Invention

The present invention relates to an apparatus for measuring a displacement, and more particularly, to an apparatus for measuring a two-dimensional displacement.

2. Description of Related Art

The conventional two-dimensional displacement measuring module consists of two linear displacement measuring modules disposed orthogonally with respect to each other, the linear displacement measuring module being a common apparatus such as an optical linear scale encoder, a magnetic scale encoder, a linear variable differential transformer (LVDT) or a laser interferometer. However, the aforesaid two-dimensional displacement measuring module is suitable for the low-precision systems only, and has difficulty in meeting the requirement for being used in the high-precision systems. For example, there are problems in orthogonality precision between the two axes and orthogonality between a beam splitter/mirror and the optical path of an interferometer. Because of the orthogonal arrangement, highly-skilled technicians are always necessary for conforming to the requirement for a high-precision system. Therefore, costs for education and training of staff as well as risk of personnel outflow are increased.

Although there are currently several methods for improving the two-dimensional displacement measuring apparatus, a number of defects in efficiency exist. For example, U.S. Pat. No. 5,204,524 discloses a two-dimensional displacement measuring apparatus, in which both resolution and precision are limited by geometrical optic lens, to be further used at the high precision level. U.S. Pat. No. 5,424,833 also discloses a two-dimensional displacement measuring apparatus in which beams are diffracted three times with the undesired result that the luminance is poor, thus demanding finely manufactured components and assembly of the components to be involved in the system. U.S. Pat. No. 5,530,543 discloses a two-dimensional displacement measuring apparatus in which self-compensating function for errors are absent so that outputting signals are likely to be unstable in practice.

In addition, U.S. Pat. No. 6,744,520, to the inventors of the present invention, entitled Method for Measuring Two-dimensional Displacement by Conjugate Optical Paths, is provided to solve the defects of the aforesaid two-dimensional displacement measuring apparatuses. The method for measuring two-dimensional displacement by conjugate optical paths particularly concerns a method for measuring two-dimensional displacement, being tolerant of low fitting precision between optic lens and high alignment error between the optic lens and diffraction gratings. However, this two-dimensional diffraction means causes a plurality of diffracted beams in which a second-order diffracted beam (i.e., (2.0)-order diffracted beam) generated as a result of the first diffraction of the light to be very close to a second diffracted beam. If a laser light source having a longer coherent length is used, a combined wave signal consisting of two periodic wave interference signals will be formed, as shown in FIG. 1. It is therefore difficult for the second diffracted beam to be taken out individually.

Hence, there is a dire need to provide a two-dimensional displacement measuring apparatus where periodic wave interference signals formed relative to a displacement of the two-dimensional diffraction means are taken out easily so as to avoid an interference from occurring between different-order diffracted beams.

SUMMARY OF THE INVENTION

An object of the present invention is to provide a two-dimensional displacement measuring apparatus so as to easily obtain periodic wave interference signals formed relative to a displacement of two-dimensional diffraction device.

A further object of the present invention is to provide a two-dimensional displacement measuring apparatus so as to have tolerance of high alignment error, low manufacturing cost and high product yield.

To attain the aforesaid objects, an apparatus for measuring two-dimensional displacement according to the present invention is adapted to measure a two-dimensional displacement, comprising a two-dimensional diffraction unit, a laser light source for providing an incident light, a beam splitter for separating the incident light into at least two beams to be incident on the two-dimensional diffraction unit so as to generate a plurality of first diffracted beams and a plurality of second-order diffracted beams from the first diffraction of the beams, a plurality of staggered conjugate optic lens for reflecting the first diffracted beams respectively so that the first diffracted beams return to the two-dimensional diffraction unit to generate a plurality of second diffracted beams where the second diffracted beams and the second-order diffracted beams generated as a result of the first diffraction of the beams stagger, and a plurality of interference optical dephasing modules for receiving the second diffracted beams respectively so as to separate each of the second diffracted beams into at least two signal beams by which a two-dimensional displacement is measured.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
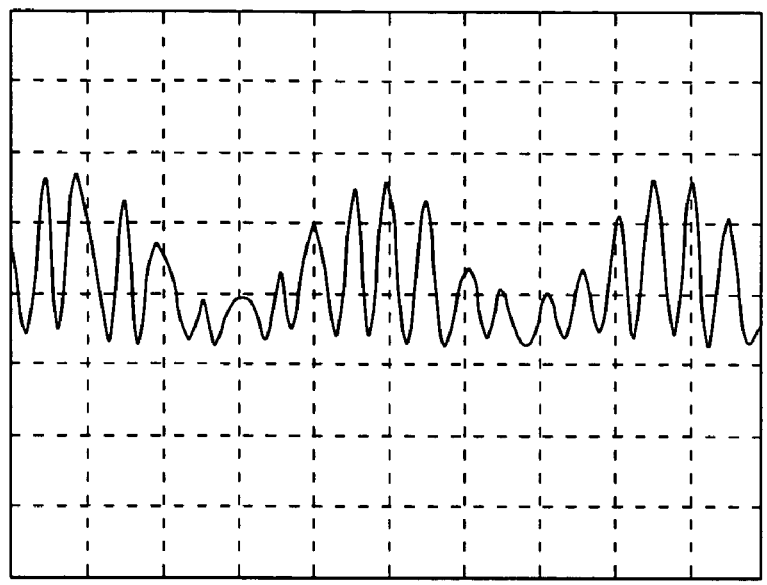
FIG. 1 is a schematic view of two periodic wave interference signals of the prior art.
Figure 2:
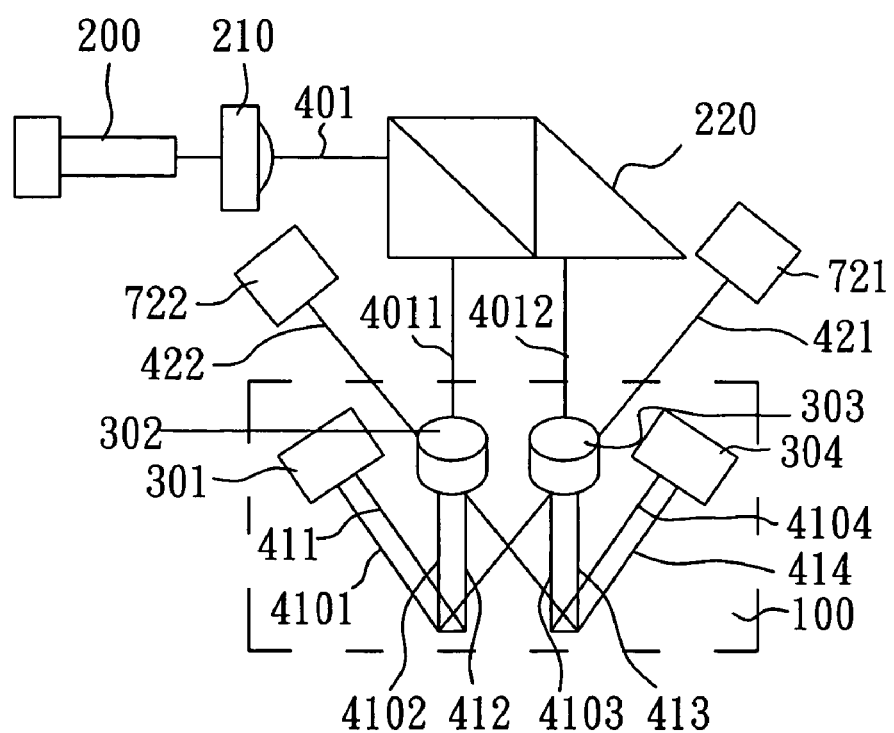
FIG. 2 is a schematic view of a construction of a preferred embodiment according to the present invention.

FIG. 2 illustrates a schematic view of an embodiment according to the present invention, which comprises a laser light source 200, a collimator lens 210, a beam splitter 220, a plurality of staggered conjugate optic lens 301, 302, 303, 304, two interference optical dephasing modules 721, 722, and a diffraction unit 100. In the present embodiment, it is preferable to have four staggered conjugate optic lens 301, 302, 303, 304.

The said laser light source 200 is adapted to provide light having coherent length, the light being so intense so as to result in an interference. In this embodiment, the light provided by the laser light source 200 is preferably a linearly polarized light or a circularly polarized light. The beams emitted from the laser light source 200 are collimated by means of the collimator lens 210 to form laser beams 401 that substantially run parallel with each other. In this embodiment, the collimator lens 210 can be a single lens, multiple lenses or a gradient index (GRIN) lens. The beam splitter 220 is adapted to receive the collimated laser beams 401 to generate two incident beams 4011, 4012, both of which are incident on the two-dimensional diffraction unit 100 in a substantially perpendicular manner. Detection of a two-dimensional displacement according to the present embodiment will be described in detail.

After the incident beam 4011 enters the two-dimensional diffraction unit 100, two first diffracted beams 411, 412 (first-order diffracted beams) are formed, while two first-order diffracted beams 413, 414 generated as a result of the first diffraction of the incident beam 4012 are formed after the incident beam 4012 enters the two-dimensional diffraction unit 100. Due to the Doppler effect, the first diffracted beams 411, 412, 413, 414 carry signals of different phase associated with two-dimensional displacements respectively when the laser light source 200 moves two-dimensionally relative to the two-dimensional diffraction unit 100.

Hence, the first diffracted beams 411, 412 are obtained by means of two staggered conjugate optic lens 301, 302, respectively. Namely, the first diffracted beam 411 is incident on the staggered conjugate optic lens 301 while the first diffracted beam 412 is incident on the staggered conjugate optic lens 302. In this embodiment, the staggered conjugate optic lens 301, 302, 303, 304 are preferably GRIN lenses having a reflection layer coated on the back thereof or corner cube prisms. Most preferably, they are lenses consisting of convergent lenses and plane mirrors. The lenses will be described below.

Figure 3:
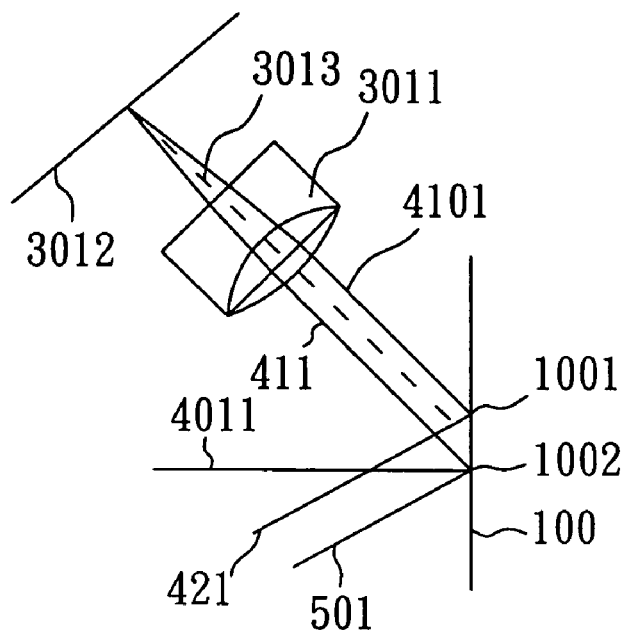
FIG. 3 is a schematic view of a preferred embodiment according to the present invention, in which a beam is incident on one of conjugate optic lens.

FIG. 3 illustrates a schematic view of the beam 411 incident on the conjugate optic lens 301. With reference to both FIGS. 2 and 3, the conjugate optic lens 301 consists of a convergent lens 3011 (e.g., a cemented doublet) and a plane mirror 3012. After the incident beam 4011 enters the two-dimensional diffraction unit 100, the first diffracted beams 411, 412 will be formed. Herein, the first diffracted beam 411 is used for the purpose of illustration. After the incident beam 4011 enters the two-dimensional diffraction unit 100, a second/(2.0)-order diffracted beam 501 generated from the first diffraction of the incident beam will be formed, in addition to the first diffracted beam 411.

Accordingly, the position of the conjugate optic lens 301 is adjusted so that the first diffracted beam 411 generated as a result of the first diffraction of the incident beam 4011 will be incident on the convergent lens 3011 from a re-location above the optical axis 3013 of the conjugate optic lens 301. Then, the beam is reflected by means of the plane mirror 3012 to enter the convergent lens 3011 again, whereby a return beam 4101 is emitted back below the optical axis 3013 for re-entering the two-dimensional diffraction unit 100 to generate a second diffracted beam 421. Because the incidence point 1001 of the return beam on the two-dimensional diffraction unit 100 is different from the incidence point 1002 of the incident beam on the two-dimensional diffraction unit 100, the second-order beam 501 is generated as a result of the first diffraction of the incident beam and the second diffracted beam 421 stagger without causing an interference. Hence, a periodic wave interference signal formed by a displacement of the two-dimensional diffraction unit 100 is easily obtained.

Then, with reference to FIG. 2, in the present embodiment, the conjugate optic lens 301, 302 are used for taking out optical signals in the X direction while the conjugate optic lens 303, 304 are used for taking out optical signals in the Y direction. As described above, the collimated laser light 401 enters the beam splitter 220, forming the incident beams 4011, 4012. The incident beams 4011, 4012 are incident on the two-dimensional diffraction unit 100 so that the incident beam 4011 generates the first diffracted beams 411, 412 while the incident beam 4012 generates the first diffracted beams 413, 414. The first diffracted beams 411, 412 enter the conjugate optic lens 301, 302 respectively to form return beams 4101, 4102 from the conjugate optic lens 301, 302. The return beams 4101, 4102 then enter the two-dimensional diffraction unit 100 to generate the second diffracted beam 421, in which the second diffracted beam 421 is formed by combining beams reflected from the return beams 4101, 4102 which had been incident on the two-dimensional diffraction unit 100 so as to detect a displacement in the X direction by the second diffracted beam 421.

The first diffracted beams 413, 414 enter the conjugate optic lens 303, 304 respectively to form return beams 4103, 4104 from the conjugate optic lens 303, 304. The return beams 4103, 4104 then enter the two-dimensional diffraction unit 100 to generate a second diffracted beam 422 for detecting a displacement in the Y direction.

The said second diffracted beams 421, 422 enter the interference optical dephasing modules 721, 722 respectively so that sine and cosine signals are formed in the X and Y directions by means of the interference optical dephasing modules 721, 722 respectively to generate interference fringes for calculating two-dimensional displacements.

Figure 4:
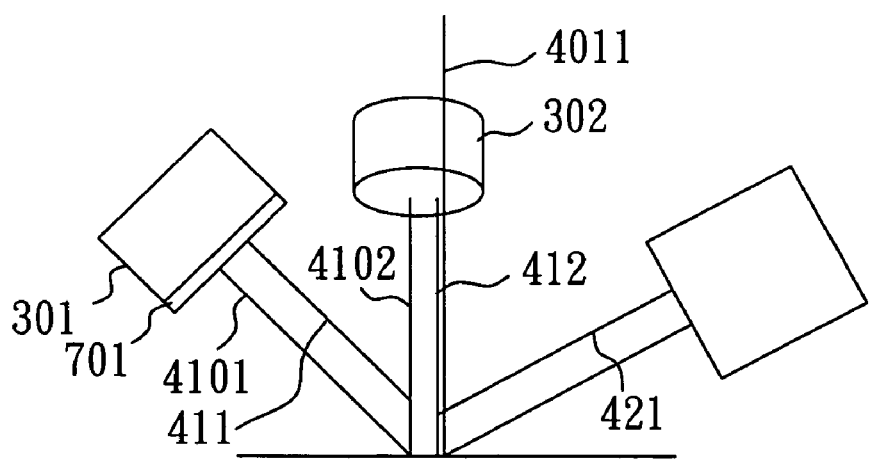
FIG. 4 is a schematic view of a preferred embodiment according to the present invention, in which a wave plate is disposed one of conjugate optic lens.

Various of wave plates can also be disposed on the conjugate optic lens 301, 302, 302, 304 to be adapted to the polarization type of the laser beams provided by the laser light source 200. FIG. 4 schematically illustrates a wave plate disposed on the conjugate optic lens 301, 302 for being adapted to the laser light source 200. If the laser light source 200 generates left circularly polarized laser light, a quarter-wave plate 701 is added to either the conjugate optic lens 301 in the X direction or the conjugate optic lens 302 in the Y direction (in this case, for example, the conjugate optic lens 301) so that the first diffracted beam 411 passes through the quarter-wave plate 701 twice to change polarization of light from the left circularly polarized light into right circularly polarized light.

The first diffracted beam 412 remains as left circularly polarized light because no wave plate is disposed on the conjugate optic lens 302. In this connection, after the return beams 4101, 4102 enter the two-dimensional diffraction unit 100, the second diffracted beam 421 will include left circularly polarized light and right circularly polarized light.

Figure 5:
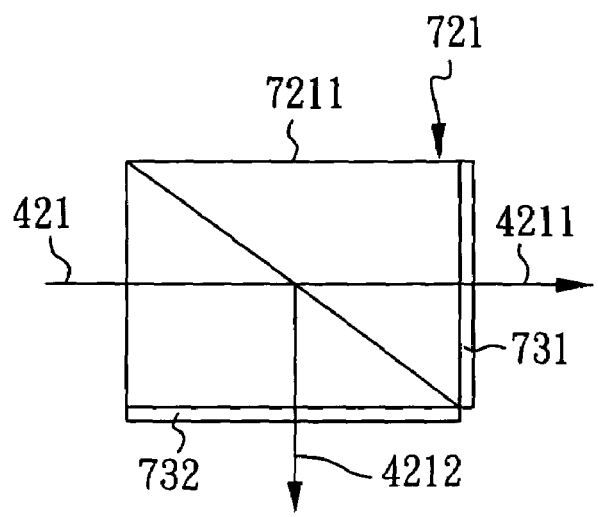
FIG. 5 is a schematic view of a preferred embodiment according to the present invention, illustrating a first embodiment of an interference optical dephasing module.

FIG. 5 schematically illustrates a first embodiment of the aforesaid interference optical dephasing module 721. With reference to FIGS. 2 and 5 for the following description, because the second diffracted beam 421 reflected by the two-dimensional diffraction unit 100 contains information about displacement in the X direction, the second diffracted beam 421 is dephased by means of the interference optical dephasing module 721 to obtain periodic wave signals of displacement information in the X direction so that a two-dimensional displacement is measured based on the periodic wave signals. The interference optical dephasing module 721 comprises a beam splitter 7211 and polarisers 731, 732, the polarisers 731, 732 being disposed on the optical paths formed by the beam splitter 7211 respectively with an angle of 45° between the optical axes thereof. After the second diffracted beam 421 enters the interference optical dephasing module 721, two signal beams 4211, 4212, which are split by means of the beam splitter 7211, pass through the polarisers 731, 732 respectively, to form sine and cosine signals in the X direction. The interference optical dephasing module 722 is constructed in the same manner as the aforesaid interference optical dephasing module 721. The second diffracted beam 422 is also split to cause sine and cosine signals to be formed in the Y direction.

Figure 6:
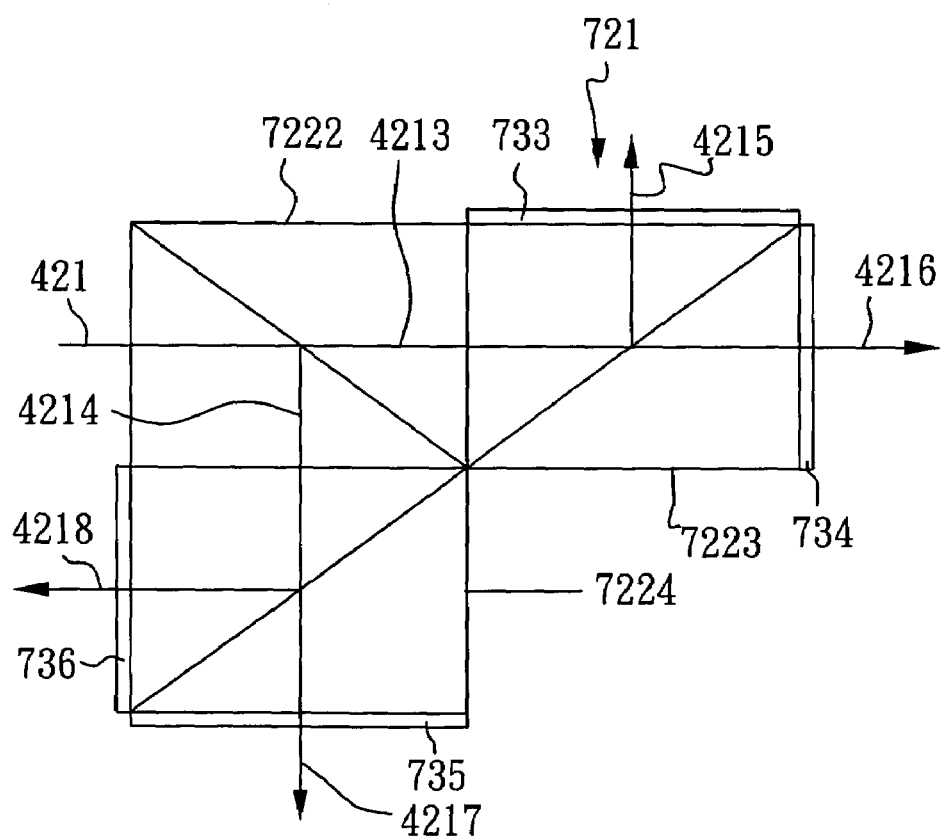
FIG. 6 is a schematic view of another preferred embodiment according to the present invention, illustrating a second embodiment of an interference optical dephasing module.

FIG. 6 schematically illustrates a second embodiment of the interference optical dephasing module 721. With reference to FIGS. 2 and 6 for the following description, the interference optical dephasing module 721 comprises beam splitters 7222, 7223, 7224 and polarisers 733, 734,735 736 having an angle of 45° between the optical axes thereof. After the second diffracted beam 421 enters the interference optical dephasing module 721, two signal beams 4213, 4214 are split by means of the beam splitter 7222. Further, the signal beam 4213 is split by means of the beam splitter 7223 to form two signal beams 4215, 4216 while the signal beam 4214 is split by means of the beam splitter 7224 to form two signal beams 4217, 4218. Accordingly, the four signal beams 4215, 4216, 4217, 4218 are formed after the second diffracted beam 421 enters the interference optical dephasing module 721, passing through the polarisers 733, 734, 735, 736, respectively.

In sum, the second-order diffracted beams generated as a result of the first diffractions and the second diffracted beams are separated by means of the conjugate optic lens without causing an interference. In addition, the wave plate is disposed on one of the conjugate optic lens so that the second diffracted beam contains information of two different polarizations. Also, the interference optical dephasing module is used to separate the second diffracted beam into at least sine and cosine signal beams. Hence, periodic wave interference signals relative to a displacement of two-dimensional diffraction unit can be easily obtained, resulting in tolerance of high alignment error, lower manufacturing cost and increased product yield.

Although the present invention has been explained in relation to its preferred embodiments, it is to be understood that many other possible modifications and variations can be made without departing from the spirit and scope of the invention as hereinafter claimed.

What is claimed is:

1. A two-dimensional displacement measuring apparatus adapted to measure a two-dimensional displacement, comprising:
   a two-dimensional diffraction unit;
   a laser light source for providing an incident light;
   a beam splitter for separating said incident light into at least two beams to be incident on said two-dimensional diffraction unit so as to generate a plurality of first diffracted beams and a plurality of second-order diffracted beams from the first diffraction of said beams;
   a plurality of conjugate optical lenses for reflecting said first diffracted beams respectively so that said first diffracted beams return to said two-dimensional diffraction unit to generate a plurality of second diffracted beams where said second diffracted beams and said second-order diffracted beams generated as a result of the first diffraction of said beams stagger; and
   a plurality of interference optical dephasing modules for receiving said second diffracted beams respectively so as to separate each of said second diffracted beams into at least two signal beams by which a two-dimensional displacement is measured.

2. The measuring apparatus of claim 1, wherein each of said conjugate optical lenses has a convergent lens and a plane mirror so that said first diffracted beam is incident on said convergent lens and then reflected back to said convergent lens by means of said plane mirror to return to said two-dimensional diffraction unit.

3. The measuring apparatus claim 1, wherein said second diffracted beam carries periodic wave signals to be dephased by means of said interference optical dephasing modules so that said two-dimensional displacement is measured by said signal beams.

4. The measuring apparatus of claim 1, wherein staggered conjugate optic lenses are gradient index (GRIN) lenses having a reflection layer.

5. The measuring apparatus of claim 1, wherein staggered conjugate optic lens are corner cube prisms.

6. The measuring apparatus of claim 1, further comprising a collimator lens disposed between said laser light source and said beam splitter to collimate said incident light into laser beams that substantially run parallel with each other.

7. The measuring apparatus of claim 5, wherein said collimator lens is a single lens, multiple lenses or a gradient index (GRIN) lens.

8. The measuring apparatus of claim 1, wherein each of said interference optical dephasing modules has a first diffraction unit and a plurality of first polarisers, said first polarisers being disposed on the optical paths of said diffracted beams generated by means of said first diffraction unit respectively.

9. The measuring apparatus of claim 1, wherein each of said interference optical dephasing modules has a second diffraction unit and a plurality of second polarisers, said second polarisers being disposed on the optical paths of said diffracted beams generated by means of said second diffraction unit respectively.

10. The measuring apparatus of claim 1, wherein said signal beams are used to generate sine signals and cosine signals.

11. The measuring apparatus of claim 1, wherein said incident light source provides an incident light which is a linearly polarized light or a circularly polarized light.

* * * * *